United States Patent
Blumrich et al.

(10) Patent No.: US 8,949,539 B2
(45) Date of Patent: Feb. 3, 2015

(54) CONDITIONAL LOAD AND STORE IN A SHARED MEMORY

(75) Inventors: Matthias A. Blumrich, Yorktown Heights, NY (US); Martin Ohmacht, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 936 days.

(21) Appl. No.: 12/697,799

(22) Filed: Feb. 1, 2010

(65) Prior Publication Data

US 2011/0119446 A1    May 19, 2011

Related U.S. Application Data

(60) Provisional application No. 61/261,269, filed on Nov. 13, 2009, provisional application No. 61/293,611, filed on Jan. 8, 2010, provisional application No. 61/295,669, filed on Jan. 15, 2010.

(51) Int. Cl.
| | |
|---|---|
| *G06F 13/00* | (2006.01) |
| *G06F 13/28* | (2006.01) |
| *G06F 15/173* | (2006.01) |
| *G06F 9/30* | (2006.01) |

(52) U.S. Cl.
CPC ...... *G06F 15/17381* (2013.01); *G06F 9/30072* (2013.01)
USPC ........... 711/130; 711/122; 711/145; 711/152; 711/E12.038; 711/E12.091

(58) Field of Classification Search
CPC ................. G06F 17/30362; G06F 9/30072
See application file for complete search history.

(56) References Cited

U.S. PATENT DOCUMENTS

| | | | |
|---|---|---|---|
| 6,275,907 B1 * | 8/2001 | Baumgartner et al. | 711/143 |
| 2005/0251644 A1 * | 11/2005 | Maher et al. | 712/2 |
| 2007/0033345 A1 * | 2/2007 | Guthrie et al. | 711/122 |
| 2011/0055482 A1 * | 3/2011 | So et al. | 711/122 |

* cited by examiner

*Primary Examiner* — Eric S Cardwell
(74) *Attorney, Agent, or Firm* — Scully, Scott, Murphy & Presser, P.C.; Daniel P. Morris, Esq.

(57) ABSTRACT

A method, system and computer program product for implementing load-reserve and store-conditional instructions in a multi-processor computing system. The computing system includes a multitude of processor units and a shared memory cache, and each of the processor units has access to the memory cache. In one embodiment, the method comprises providing the memory cache with a series of reservation registers, and storing in these registers addresses reserved in the memory cache for the processor units as a result of issuing load-reserve requests. In this embodiment, when one of the processor units makes a request to store data in the memory cache using a store-conditional request, the reservation registers are checked to determine if an address in the memory cache is reserved for that processor unit. If an address in the memory cache is reserved for that processor, the data are stored at this address.

25 Claims, 4 Drawing Sheets

CONDITIONAL LOAD AND STORE IN A SHARED MEMORY

CROSS-REFERENCE TO RELATED APPLICATIONS

This application claims the benefit of U.S. Patent Application Ser. Nos. 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, co-pending U.S. patent applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799 (YOR920090533US1 (24682)), for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252 (YOR920090581US1 (24732)), for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502 (YOR920090582US1 (24733)), for "MEMORY SPECULATION IN A MULTI LEVEL CACHE SYSTEM"; U.S. patent application Ser. No. 13/008,583 (YOR920090583US1 (24738)), for "SPECULATION AND TRANSACTION IN A SYSTEM SPECITATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 12/984,308 (YOR920090584US1 (24739)), for "MINIMAL FIRST LEVEL CACHE SUPPORT FOR MEMORY SPECULATION MANAGED BY LOWER LEVEL CACHE"; U.S. patent application Ser. No. 12/984,329 (YOR920090585US1 (24740)), for "PHYSICAL ADDRESS ALIASING TO SUPPORT MULTI-VERSIONING IN A SPECULATION-UNAWARE CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 61/293,554, filed Jan. 8, 2010, for "TWO DIFFERENT PREFETCHING COMPLEMENTARY ENGINES OPERATING SIMULTANEOUSLY"; U.S. patent application Ser. No. 12/697,015 (YOR920090598US1 (24761)), for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 12/697,043 (YOR920090633US1 (24801)), for "IMPLEMENTING ASYNCHRONOUS COLLECTIVE OPERATIONS IN A MULTI-NODE PROCESSING SYSTEM"; U.S. patent application Ser. No. 13/008,546 (YOR920090586US1 (24861)), for "MULTIFUNCTIONING CACHE"; U.S. patent application Ser. No. 12/697,175 (YOR920090645US1 (24873)) for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATA-FLOW"; U.S. patent application Ser. No. (YOR920090648US1 (24876)) for "EMBEDDING GLOBAL BARRIER AND COLLECTIVE IN A TORUS NETWORK"; U.S. patent application Ser. No. 61/293,499, filed Jan. 8, 2010 for "GLOBAL SYNCHRONIZATION OF PARALLEL PROCESSORS USING CLOCK PULSE WIDTH MODULATION"; U.S. patent application Ser. No. 61/293,266, filed Jan. 8, 2010 for "IMPLEMENTATION OF MSYNC"; U.S. patent application Ser. No. 12/796,389 (YOR920090651US1 (24879)) for "NON-STANDARD FLAVORS OF MSYNC"; U.S. patent application Ser. No. 12/696,817 (YOR920090652US1 (24881)) for "HEAP/STACK GUARD PAGES USING A WAKEUP UNIT"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 12/774,475 (YOR920100001US1 (24883)) for "REPRODUCIBILITY IN A MULTIPROCESSOR SYSTEM".

GOVERNMENT CONTRACT

This invention was Government supported under Contract No. B554331 awarded by Department of Energy. The Government has certain rights in this invention.

BACKGROUND OF THE INVENTION

Field of the Invention

The present invention, generally, relates to data processing systems, and in particular, to memory management in multi-processor systems. Even more specifically, this invention relates to managing the loading and storing of data conditionally in memories of multi-processor systems.

A conventional multi-processor computer system includes multiple processing units (a.k.a. processors or processor cores) all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some multiprocessor systems, the cache hierarchy includes at least two levels. The level one (L1), or upper-level cache is usually a private cache associated with a particular processor core and cannot be directly accessed by other cores in the system. Typically, in response to a memory access instruction such as a load or store instruction, the processor core first accesses the upper-level cache. If the requested memory block is not found in the upper-level cache or the memory access request cannot be serviced in the upper-level cache (e.g., the L1 cache is a store-though cache), the processor core then accesses lower-level caches (e.g., level two (L2) or level three (L3) caches) to service the memory access to the requested memory block. The lowest level cache (e.g., L2 or L3) is often shared among multiple processor cores.

A coherent view of the contents of memory is maintained in the presence of potentially multiple copies of individual memory blocks distributed throughout the computer system through the implementation of a coherency protocol. The coherency protocol, entails maintaining state information associated with each cached copy of the memory block and communicating at least some memory access requests between processing units to make the memory access requests visible to other processing units.

In order to synchronize access to a particular granule (e.g., cache line) of memory between multiple processing units and threads of execution, load-reserve and store-conditional instruction pairs are often employed. For example, load-reserve and store-conditional instructions referred to as LWARX and STWCX have been implemented. Execution of a LWARX (Load Word And Reserve Indexed) instruction by a processor loads a specified cache line into the cache memory of the processor and typically sets a reservation flag and address register signifying the processor has interest in atomically updating the cache line through execution of a subsequent STWCX (Store Word Conditional Indexed) instruction targeting the reserved cache line. The cache then monitors the storage subsystem for operations signifying that another processor has modified the cache line, and if one is detected, resets the reservation flag to signify the cancellation of the reservation. When the processor executes a subsequent STWCX targeting the cache line reserved through execution of the LWARX instruction, the cache memory only performs the cache line update requested by the STWCX if the reservation for the cache line is still pending. Thus, updates to shared memory can be synchronized without the use of an atomic update primitive that strictly enforces atomicity.

Individual processors usually provide minimal support for load-reserve and store-conditional. The processors basically hand off responsibility for consistency and completion to the external memory system. For example, a processor core may treat load-reserve like a cache-inhibited load, but invalidate the target line if it hits in the L1 cache. The returning data goes to the target register, but not to the L1 cache. Similarly, a processor core may treat store-conditional as a cache-inhibited store and also invalidate the target line in the L1 cache if it exists. The store-conditional instruction stalls until success or failure is indicated by the external memory system, and the condition code is set before execution continues. The external memory system is expected to maintain load-reserve reservations for each thread, and no special internal consistency action is taken by the processor core when multiple threads attempt to use the same lock.

In a traditional, bus-based multiprocessor system, the point of memory system coherence is the bus itself. That is, coherency between the individual caches of the processors is resolved by the bus during memory accesses, because the accesses are effectively serialized. As a result, the shared main memory of the system is unaware of the existence of multiple processors. In such a system, support for load-reserve and store-conditional is implemented within the processors or in external logic associated with the processors, and conflicts between reservations and other memory accesses are resolved during bus accesses.

As the number of processors in a multiprocessor system increases, a shared bus interconnect becomes a performance bottleneck. Therefore, large-scale multiprocessors use some sort of interconnection network to connect processors to shared memory (or a cache for shared memory). Furthermore, an interconnection network encourages the use of multiple shared memory or cache slices in order to take advantage of parallelism and increase overall memory bandwidth. FIG. 1 shows the architecture of such a system, consisting of eighteen processors 52, a crossbar switch interconnection network 60, and a shared L2 cache consisting of sixteen slices 72. In such a system, it may be difficult to maintain memory consistency in the network, and it may be necessary to move the point of coherence to the shared memory (or shared memory cache when one is present). That is, the shared memory is responsible for maintaining a consistent order between the servicing of requests coming from the multiple processors and responses returning to them.

It is desirable to implement synchronization based on load-reserve and store-conditional in such a large-scale multiprocessor, but it is no longer efficient to do so at the individual processors. What is needed is a mechanism to implement such synchronization at the point of coherence, which is the shared memory. Furthermore, the implementation must accommodate the individual slices of the shared memory. A unified mechanism is needed to insure proper consistency of lock reservations across all the processors of the multiprocessor system.

BRIEF SUMMARY

Embodiments of the invention provide a method, system and computer program product for implementing load-reserve and store-conditional functionality in a multi-processor computing system. The computing system includes a multitude of processor units and a shared memory, and each of the processor units has access to the shared memory. In one embodiment, the method comprises providing the shared memory with a cache, and providing the shared memory cache with a series of reservation registers, and storing in the reservation registers of the memory cache addresses in the memory cache reserved for each of the processor units as a result of issuing load-reserve requests. In this embodiment, when one of the processor units makes a request to store data in the memory using a store-conditional request, the reservation registers are checked to determine if one of the addresses in the memory is reserved for said one of the processor units; and if one of the addresses in the memory is reserved for said one of the processors, the data are stored at said one of the addresses.

In an embodiment, the memory cache includes a multitude of slices, and each of the processor units has access to each of said slices. In one embodiment, the providing includes providing each of said slices of the memory cache with a respective one set of the reservation registers.

In one embodiment, the series of reservation registers includes a multitude of subsets of the reservation registers, and the storing includes, each of the processor units using a respective one of said subsets of reservation registers to reserve addresses in the memory cache for said each processor unit.

In an embodiment of the invention, a plurality of threads operate on each of the processor units, and when one of the threads makes a request for an address reservation, one of the registration registers is checked to determine if said one of the threads has already made an address registration.

DETAILED DESCRIPTION

Figure 1:
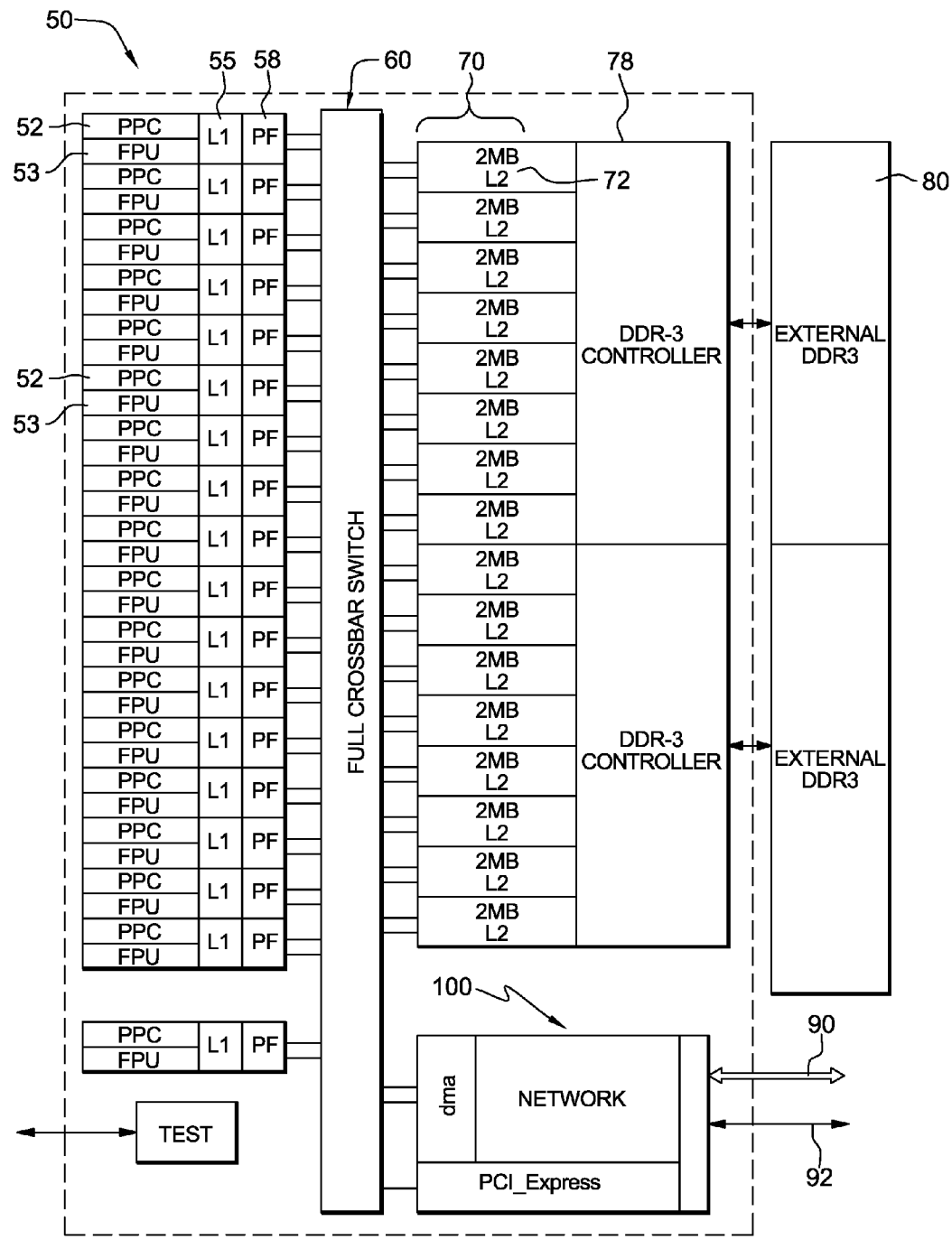
FIG. 1 is a block diagram of a data processing system in which an embodiment of the invention is practiced.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, there is shown the overall architecture of a multiprocessor computing node 50 implemented in a parallel computing system in which the present invention is implemented. In one embodiment, the multiprocessor system implements the proven Blue Gene architecture, and is implemented in a Blue Gene/Q massively parallel computing system comprising, for example, 1024 compute node ASICs (BQC), each including multiple processor cores.

A compute node of this present massively parallel super-computer architecture and in which the present invention may be employed is illustrated in FIG. 1. The compute node 50 is a single chip ("nodechip") based on low-power A2 PowerPC processor cores, though the architecture can use any low-power processor cores, and may comprise one or more semi-conductor chips. In the embodiment depicted, the node includes 18 PowerTC A2 processor cores running at 1600 MegaHertz (MHz).

More particularly, the basic nodechip 50 of the massively parallel supercomputer architecture illustrated in FIG. 1 includes eighteen symmetric multiprocessing (SMP) processor cores 52, supporting transactional memory and thread-level speculation. Each core is 4-way hardware threaded, and includes a Quad Floating Point Unit (FPU), yielding a peak node performance of 204.8 GigaFlops (for sixteen FPUs). Of the eighteen cores, sixteen are used for application computation, one is used by the operating system, and one is a redundant spare allowing for 17+1 redundancy. Therefore, only seventeen of the eighteen cores are utilized by a functioning nodechip. In one implementation, the core operating frequency target is 1.6 GigaHertz (GHz) providing, for example, a 563 GigaByte/second (GB/s) bisection bandwidth to shared L2 cache 70 via a full crossbar switch 60. In one embodiment, there is provided 32 MegaBytes (MB) of shared L2 cache 70, implemented as sixteen individual slices 72, each 2 MB in size. There is further provided external DDR SDRAM (e.g., Double Data Rate Synchronous Dynamic Random Access Memory) 80, as a lower level in the memory hierarchy in communication with the L2 cache. In one embodiment, the node includes 42.6 GB/s DDR3 bandwidth (1.333 GHz DDR3, 2 channels each with chip kill protection).

Each FPU 53 associated with a core 52 has a 32 byte wide data path to the L1-cache 55 of the A2, allowing it to load or store 32 bytes per cycle from or into the L1-cache 55. Each core 52 is directly connected to a private prefetch unit (level-1 prefetch, L1P) 58, which accepts, decodes and dispatches all requests sent out by the A2. The store interface from the A2 core 52 to the L1P 55 is 32 bytes wide and the load interface is 16 bytes wide, both operating at processor frequency. The L1P 55 implements a fully associative, 32-entry prefetch buffer. Each entry can hold an L2 line of 128 bytes in size. The DP provides two prefetching schemes for the private prefetch unit 58: a sequential prefetcher as used in previous BlueGene architecture generations, as well as a list prefetcher As shown in FIG. 1, the 32 MB shared L2 cache is sliced into 16 units, each connecting to a slave port of the switch 60. Every physical address is mapped to one slice using a selection of programmable address bits or a XOR-based hash across all address bits. The L2-cache slices, the L1Ps and the L1 caches of the A2s are hardware-coherent. A group of four L2 cache slices is connected via a ring to one of the two DDR3 SDRAM controllers 78.

By implementing a direct memory access engine referred to herein as a Messaging Unit, "MU" such as MU 100, with each MU including a DMA engine and Network Card interface in communication with the crossbar switch 60, chip I/O functionality is provided. In one embodiment, the compute node further includes, in a non-limiting example, 10 intra-rack interprocessor links 90, each operating at 2.0 GB/s, and one I/O link 92 operating at 2.0 GB/s. In one embodiment, the interprocessor links can be used to configure the nodes as a 5-dimensional torus and the I/O link can be used to communicate with an I/O subsystem. The system node employs or is associated and interfaced with a 8-16 GB memory/node. The ASIC may consume up to about 30 watts chip power.

The A2 processor core is a 4-way multi-threaded, 64-bit, PowerPC implementation. Each A2 processor core has its own execution unit (XU), instruction unit (IU), and associated quad floating point unit (QPU) connected via the AXU (Auxiliary eXecution Unit). The QPU is a quad-wide, fused multiply-add, SIMD floating point unit, producing 8 double-precision operations per cycle, for a total of 136 floating-point operations per cycle per compute chip. The QPU is an implementation of the 4-way SIMD QPX floating-point instruction set architecture. QPX is an extension of the scalar PowerPC floating-point architecture, which defines thirty-two 32 B-wide floating point registers per thread instead of the traditional thirty-two scalar, 8 B-wide floating-point registers.

In the embodiment described above, each A2 processor core has four independent hardware threads sharing a single L1 cache with a 64-byte line size. Every memory line is stored in a particular L2 cache slice, depending on the address mapping. That is, the sixteen L2 slices effectively comprise a single L2 cache, which is the point of shared memory coherence for the compute node. Those skilled in the art will recognize that the invention applies to different multiprocessor configurations including a single L2 cache (i.e. one slice), a main memory with no L2 cache, and a main memory consisting of multiple slices.

Figure 4:
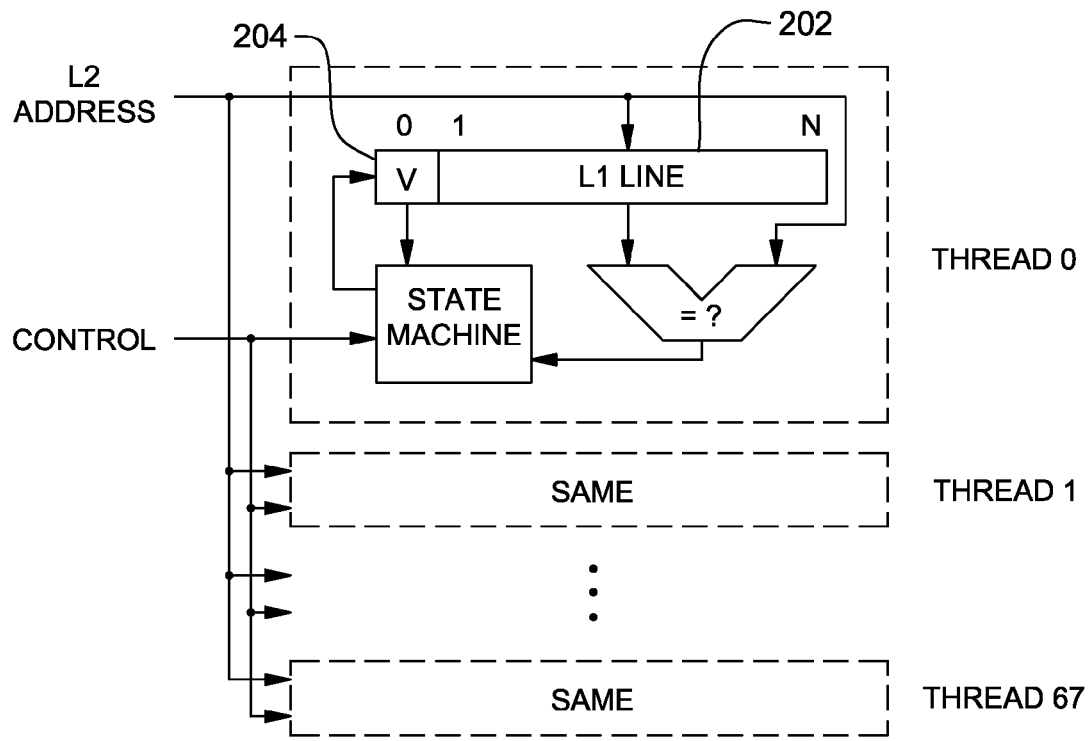
FIG. 4 is a block diagram of one embodiment of storage for load-reserve reservations at a shared memory (or a cache for the shared memory).

Each L2 slice has some number of reservation registers to support load-reserve/store-conditional locks. One embodiment that would accommodate unique lock addresses from every thread simultaneously is to provide 68 reservation registers in each slice, because it is possible for all 68 threads to simultaneously use lock addresses that fall into the same L2 slice. Each reservation register would contain an N-bit address (specifying a unique 64-byte L1 line) and a valid bit, as shown in FIG. 4. Note that the logic shown in FIG. 4 is implemented in each slice of the L2 cache. The number of address bits stored in each reservation register is determined by the size of the main memory, the granularity of lock addresses, and the number of L2 slices. For example, a byte address in a 64 GB main memory requires 36 bits. If memory addresses are reserved as locks at an 8-byte granularity, then a lock address is 33 bits in size. If there are 16 L2 slices, then 4 address bits are implied by the memory reference steering logic that determines a unique L2 slice for each address. Therefore, each reservation register would have to accommodate a total of 29 address bits (i.e. N equals 29 in FIG. 4).

When a load-reserve occurs, the reservation register corresponding to the ID (i.e. the unique thread number) of the thread that issued the load-reserve is checked to determine if the thread has already made a reservation. If so, the reservation address is updated with the load-reserve address. If not, the load-reserve address is installed in the register and the valid bit is set. In both cases, the load-reserve continues as an ordinary load and returns data.

When a store-conditional occurs, the reservation register corresponding to the ID of the requesting thread is checked to determine if the thread has a valid reservation for the lock address. If so, then the store-conditional is considered a success, a store-conditional success indication is returned to the requesting processor core, and the store-conditional is converted to an ordinary store (updating the memory and causing the necessary invalidations to other processor cores by the normal coherence mechanism). In addition, if the store-conditional address matches any other reservation registers, then they are invalidated. If the thread issuing the store-conditional has no valid reservation or the address does not match, then the store-conditional is considered a failure, a store-conditional failure indication is returned to the requesting processor core, and the store-conditional is dropped (i.e. the memory update and associated invalidations to other cores and other reservation registers does not occur).

Every ordinary store to the shared memory searches all valid reservation address registers and simply invalidates those with a matching address. The necessary back-invalidations to processor cores will be generated by the normal coherence mechanism.

Figure 2:
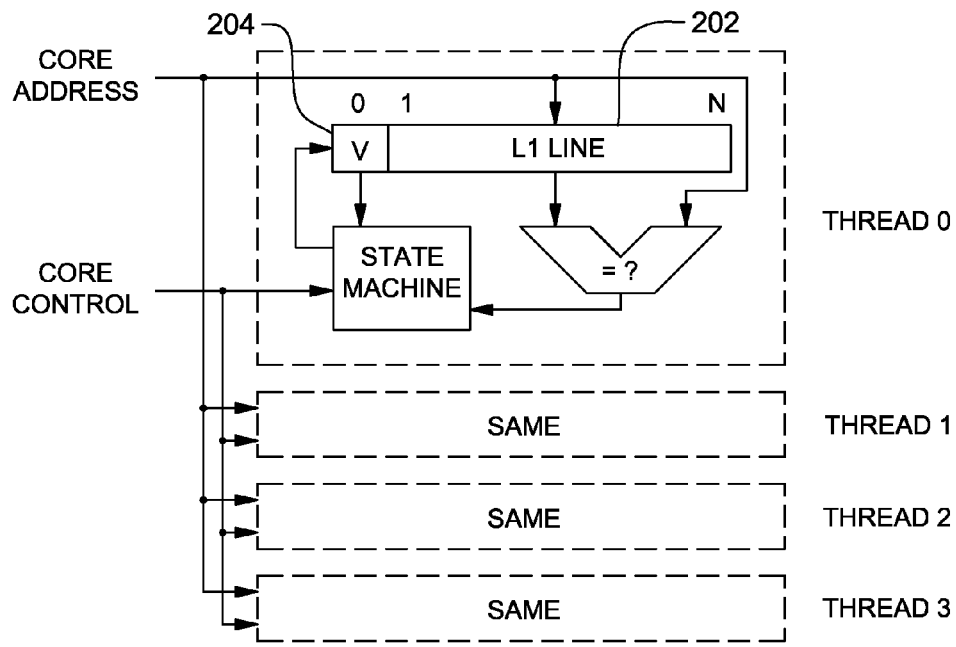
FIG. 2 is a block diagram of one embodiment of logic external to a processing core for enforcing single load-reserve reservations for four threads.

In general, a thread is not allowed to have more than one load-reserve reservation at a time. If the processor does not track reservations, then this restriction must be enforced by additional logic outside the processor. Otherwise, a thread could issue load-reserve requests to more than one L2 slice and establish multiple reservations. FIG. 2 shows one embodiment of logic that can enforce the single-reservation constraint on behalf of the processor. There are four lock reservation registers, one for each thread (assuming a processor that implements four threads). Each register stores a reservation address 202 for its associated thread and a valid bit 204. When a thread executes load-reserve, the memory address is stored in the appropriate register and the valid bit is set. If the thread executes another load-reserve, the register is simply overwritten. In both cases, the load-reserve continues on to the L2 as described above.

Figure 3:
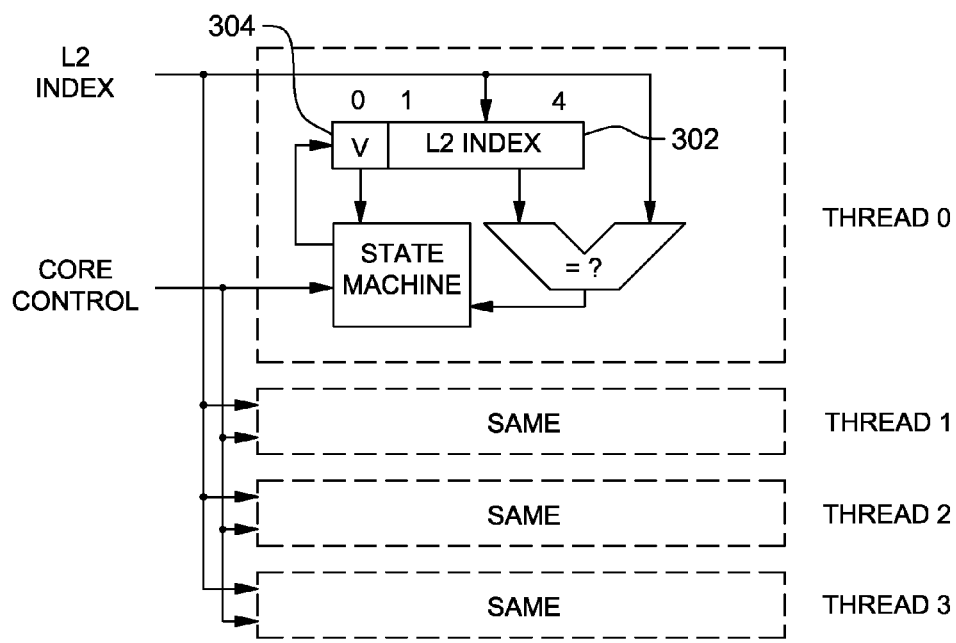
FIG. 3 is a block diagram of another embodiment of logic external to a processing core for enforcing single load-reserve reservations for four threads.

When the thread executes store-conditional, the address will be matched against the appropriate register. If it matches and the register is valid, then the store-conditional protocol continues as described above. If not, then the store-conditional is considered a failure, the core is notified, and only a special notification is sent to the L2 slice holding the reservation in order to cancel that reservation. This embodiment allows the processor to continue execution past the store-conditional very quickly. However, a failed store-conditional requires the message to be sent to the L2 in order to invalidate the reservation there. The memory system must guarantee that this invalidation message acts on the reservation before any subsequent store-conditional from the same processor is allowed to succeed Another embodiment, shown in FIG. 3, is to store an L2 slice index (4 bits for 16 slices), represented at 302, together with a valid bit, represented at 304. In this case, an exact store-conditional address match can only be performed at an L2 slice, requiring a roundtrip message before execution on the processor continues past the store-conditional. However, the L2 slice index of the store-conditional address is matched to the stored index and a mismatch avoids the roundtrip for some (perhaps common) cases, where the address falls into a different L2 slice than the reservation. In the case of a mismatch, the store-conditional is guaranteed to be a failure and the special failure notification is sent to the L2 slice holding the reservation (as indicated by the stored index) in order to cancel the reservation.

A similar tradeoff exists for load-reserve followed by load-reserve, but the performance of both storage strategies is the same. That is, the reservation resulting from the earlier load-reserve address must be invalidated at L2, which can be done with a special invalidate message. Then the new reservation is established as described previously. Again, the memory system must insure that no subsequent store-conditional can succeed before that invalidate message has had its effect.

When a load-reserve reservation is invalidated due to a store-conditional by some other thread or an ordinary store, all L2 reservation registers storing that address are invalidated. While this guarantees correctness, performance could be improved by invalidating matching lock reservation registers near the processors (FIGS. 2 and 3) as well. This is simply a matter of having the reservation logic of FIG. 2 (or FIG. 3) snoop L1 invalidations, but it does require another datapath (invalidates) to be compared (by way of the Core Address in FIG. 2 or the L2 Index in FIG. 3).

As described above, the L2 cache slices store the reservation addresses of all valid load-reserve locks. Because every thread could have a reservation and they could all fall into the same L2 slice, one embodiment, shown in FIG. 4, provides 68 lock reservation registers, each with a valid bit.

It is desirable to compare the address of a store-conditional or store to all lock reservation addresses simultaneously for the purpose of rapid invalidation. Therefore, a conventional storage array such as a static RAM or register array is preferably not used. Rather, discrete registers that can operate in parallel are needed. The resulting structure has on the order of N*68 latches and requires a 68-way fanout for the address and control buses. Furthermore, it is replicated in all sixteen L2 slices.

Figure 5:
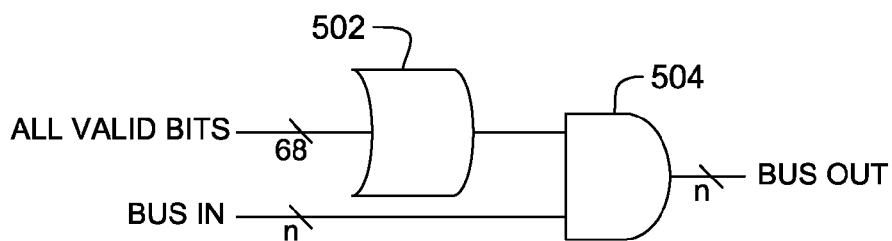
FIG. 5 illustrates logic to reduce dynamic power consumption by forcing a bus of signals to the zero state when a group of valid signals is all zero.

Because load-reserve reservations are relatively sparse in many codes, one way to address the power inefficiency of the large reservation register structure is to use clock-gated latches. Another way, as illustrated in FIG. 5, is to block the large buses behind AND gates 504 that are only enabled when at least one of the reservation registers contains a valid address (the uncommon case), as determined by an OR 502 of all the valid bits. Such logic will save power by preventing the large output bus (Bus Out) from switching when there are no valid reservations.

Figure 6:
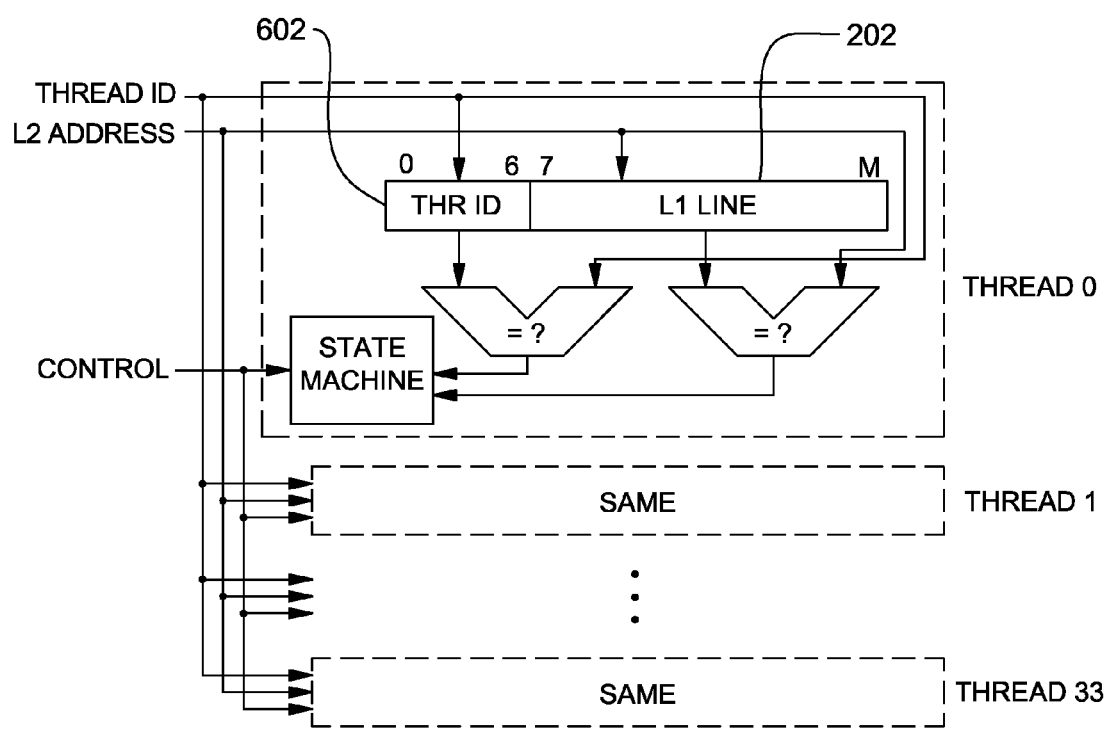
FIG. 6 is a block diagram of another embodiment of storage for load-reserve reservations at a shared memory (or cache for the shared memory), where thread IDs are stored in order to allow the storage to be shared.

Although the reservation register structure in the L2 caches described thus far will accommodate any possible locking code, it would be very unusual for 68 threads to all want a unique lock since locking is done when memory is shared. A far more likely, yet still remote, possibility is that 34 pairs of threads want unique locks (one per pair) and they all happen to fall into the same L2 slice. In this case, the number of registers could be halved, but a single valid bit no longer suffices because the registers must be shared. Therefore, each register would, as represented in FIG. 6, store a 7-bit thread ID 602 and the registers would no longer be dedicated to specific threads. Whenever a new load-reserve reservation is established, an allocation policy is used to choose one of the 34 registers, and the ID of the requesting thread is stored in the chosen register along with the address tag.

With this embodiment, a store-conditional match is successful only if both the address and thread ID are the same. However, an address-only match is sufficient for the purpose of invalidation. This design uses on the order of 34*M latches and requires a 34-way fanout for the address, thread ID, and control buses. Again, the buses could be shielded behind AND gates, using the structure shown in FIG. 5, to save switching power.

Because this design cannot accommodate all possible lock scenarios, a register selection policy is needed in order to cover the cases where there are no available lock registers to allocate. One embodiment is to simply drop new requests when no registers are available. However, this can lead to deadlock in the pathological case where all the registers are reserved by a subset of the threads executing load-reserve, but never released by store-conditional. Another embodiment is to implement a replacement policy such as round-robin, random, or LRU. Because, in some embodiments, it is very likely that all 34 registers in a single slice may be used, a policy that has preference for unused registers and then falls back to simple round-robin replacement will, in many cases provided excellent results.

Given the low probability of having many locks within a single L2 slice, the structure can be further reduced in size at the risk of a higher livelock probability. For instance, even with only 17 registers per slice, there would still be a total of 272 reservation registers in the entire L2 cache; far more than needed, especially if address scrambling is used to spread the lock addresses around the L2 cache slices sufficiently.

With a reduced number of reservation registers, the thread ID storage could be modified in order to allow sharing and accommodate the more common case of multiple thread IDs per register (since locks are usually shared). One embodiment is to replace the 7-bit thread ID with a 68-bit vector specifying which threads share the reservation. This approach does not mitigate the livelock risk when the number of total registers is exhausted.

Another compression strategy, which may be better in some cases, is to replace the 7-bit thread ID with a 5-bit processor ID (assuming 17 processors) and a 4-bit thread vector (assuming 4 threads per processor). In this case, a single reservation register can be used by all four threads of a processor to share a single lock. With this strategy, seventeen reservation registers would be sufficient to accommodate all 68 threads reserving the same lock address. Similarly, groups of threads using the same lock would be able to utilize the reservation registers more efficiently if they shared a processor (or processors), reducing the probability of livelock. At the cost of some more storage, the processor ID can be replaced by a 4-bit index specifying a particular pair of processors and the thread vector could be extended to 8 bits. As will be obvious to those skilled in the art, there is an entire spectrum of choices between the full vector and the single index.

As an example, one embodiment for the 17-processor multiprocessor is 17 reservation registers per L2 slice, each storing an L1 line address together with a 5-bit core ID and a 4-bit thread vector. This results in bus fanouts of 17.

While the preferred embodiment of the invention herein disclosed describes a multiprocessor with the reservation registers implemented in a sliced, shared memory cache, it should be obvious that the invention can be applied to many types of shared memories, including a shared memory with no cache, a sliced shared memory with no cache, and a single, shared memory cache.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of implementing conditional memory reservations in a multi-processor computing system to maintain memory consistency in a shared memory, the computing system including a multitude of processor units and a shared memory, wherein all of the processor units have access to the shared memory, and the processor units make load-reserve requests to reserve an address in the shared memory and make store-conditional requests to store data to the reserved address in the shared memory, the method comprising:
   including in the shared memory a series of reservation registers to support load-reserve/store conditional locks, each of the reservation registers including an address field and a valid bit;
   using the shared memory to maintain consistency in the shared memory, including:
   in response to one of the processor units making a load-reserve request, storing in one of said reservation registers an address in the shared memory to lock said address for said one of the processor units to maintain consistency of data in the shared memory, and setting the valid bit in the one of the registers to indicate that the address stored in said one of the registers is reserved for said one of the processor units, wherein in response to defined events, the valid bit in said one of the registers is reset to indicate that the address stored in said one of the registers is not reserved for said one of the processor units, including when one of the other processor units stores data at said address in the shared memory, the valid bit in said one of the registers is invalidated to indicate that the address stored in said one of the registers is not reserved for said one of the processor units;
   in response to said one of the processor units making a store-conditional request to store data at said address in the shared memory, checking the valid bit in said one of the reservation registers to determine if said address in the shared memory is reserved for said one of the processor units;

if the valid bit in said one of the reservation registers shows that said address in the shared memory is reserved for said one of the processor units, storing the data of said store-conditional request at said address in the shared memory; and if the valid bit in said one of the reservation registers shows that said address in the shared memory is not reserved for said one of the processor units, not storing the data of said store-conditional request at said address in the shared memory.

2. The method according to claim 1, wherein the shared memory is a shared cache.

3. The method according to claim 1, wherein the memory is divided into a multitude of slices, and each of the processor units has access to each of said slices.

4. The method according to claim 3, wherein the including in the shared memory a series of reservation registers includes providing each of said slices of the memory with a respective one set of the reservation registers.

5. The method according to claim 4, wherein each of the slices of the memory has a plurality of the reservation registers to support said each slice.

6. The method according to claim 1, wherein a plurality of threads operate on each of the processor units, and when one of the threads makes a request for an address reservation, the reservation registers are checked to determine if said one of the threads has already made an address registration.

7. The method according to claim 6, wherein when said one of the threads makes a store request, said reservation registers are checked to determine if said one of the threads has made a valid address registration.

8. The method according to claim 7, wherein a thread is not allowed to have more than one reservation at a time.

9. The method according to claim 8, wherein when a thread executes a load request, a memory address is stored in one of the registers, when the thread executes another load request, the memory address in the register is overwritten, and when the thread executes a store request, the store request is matched against a specified subset of the registers.

10. The method according to claim 1, wherein every store searches all valid reservation address registers and invalidates those with a matching address.

11. A system for implementing conditional memory reservations in a multi-processor computing system to maintain memory consistency in a shared memory, the computing system including a multitude of processor units and a shared memory, wherein all of the processor units have access to the shared memory, and the processor units make load-reserve requests to reserve an address in the shared memory and make store-conditional requests to store data to the reserved address in the shared memory, the system for implementing conditional memory reservations comprising:

a series of reservation registers included in the shared memory to support load- reserve/store conditional locks, and for storing addresses in the shared memory reserved for each of the processor units of the computing system to store data, each of the reservation registers including an address field and a valid bit; and one or more of the processor units of the computing system configured for:

using the shared memory to maintain consistency in the shared memory, including:

in response to one of the processor units making a conditional load-reserve request, storing in one of said reservation registers an address in the shared memory to lock said address for said one of the processor units to maintain consistency of data in the shared memory, and setting the valid bit in the one of the registers to indicate that the address stored in said one of the registers is reserved for said one of the processor units, wherein in response to defined events, the valid bit in said one of the registers is reset to indicate that the address stored in said one of the registers is not reserved for said one of the processor units, including when one of the other processor units stores data at said address in the shared memory, the valid bit in said one of the registers is invalidated to indicate that the address stored in said one of the registers is not reserved for said one of the processor units;

in response to said one of the processor units making a store-conditional store request to store data at said address in the shared memory, checking the valid bit in said one of the reservation registers to determine if said address in the shared memory is reserved for said one of the processor units; and if the valid bit in said one of the reservation registers shows that said address in the shared memory is not reserved for said one of the processor units, not storing the data of said store-conditional request at said address in the shared memory.

if the reservation registers shows that an address is validly reserved for said one of the processors, storing the data of said store-conditional request at said address in the shared memory.

12. A system for implementing conditional memory reservations in a multi-processor computing system to maintain memory consistency in a shared memory, the computing system including a multitude of processor units and a shared memory, wherein all of the processor units have access to the shared memory, and the processor units make load-reserve requests to reserve an address in the shared memory and make store-conditional requests to store data to the reserved address in the shared memory, the system for implementing conditional memory reservations comprising:

a series of reservation registers included in the shared memory to support load-reserve/store conditional locks, and for storing addresses in the shared memory reserved for each of the processor units of the computing system to store data, each of the reservation registers including an address field and a valid bit; and one or more of the processor units of the computing system configured for:

using the shared memory to maintain consistency in the shared memory, including:

in response to one of the processor units making a conditional load-reserve request, storing in one of said reservation registers an address in the shared memory to lock said address for said one of the processor units to maintain consistency of data in the shared memory, and setting the valid bit in the one of the registers to indicate that the address stored in said one of the registers is reserved for said one of the processor units, wherein in response to defined events, the valid bit in said one of the registers is reset to indicate that the address stored in said one of the registers is not reserved for said one of the processor units, including when one of the other processor units stores data at said address in the shared memory, the valid bit in said one of the registers is invalidated to indicate that the address stored in said one of the registers is not reserved for said one of the processor units;

in response to said one of the processor units making a store-conditional request to store data at said address in the shared memory, checking the valid bit in said one of the reservation registers to determine if said address in the shared memory is reserved for said one of the processor units; and if the valid bit in said one of the reservation registers shows that said address in the shared memory is not reserved for said one of the processor units, not storing the data of said store-conditional request at said address in the shared memory;

if the reservation registers shows that an address is validly reserved for said one of the processors, storing the data of said store-conditional request at said address in the shared memory.

13. The system according to claim 12, wherein the memory includes a multitude of slices, each of the processor units of the computing system has access to each of said slices, and each of said slices of the memory is provided with a respective one set of the reservation registers.

14. The system according to claim 12, the series of reservation registers includes a multitude of sets of the reservation registers, and each of the processor units of the computing system uses a respective one of said sets of reservation registers to reserve addresses in the memory.

15. The system according to claim 12, wherein a plurality of threads operate on each of the processor units, and when one of the threads makes a request for an address reservation, one of the reservation registers is checked to determine if said one of the threads has already made an address registration.

16. An article of manufacture comprising:

at least one tangible computer readable device having computer readable program code logic tangibly embodied therein to execute machine instructions in one or more processing units for implementing load and store instructions in a multi-processor computing system to maintain memory consistency in a shared memory, the computing system including a multitude of processor units, a shared memory, and a series of reservation registers included in the shared memory to support load-reserve/store conditional locks, each of the reservation registers including an address field and a valid bit, wherein all of the processor units have access to the shared memory and the processor units make load-reserve requests to reserve an address in the shared memory and make store-conditional requests to store data to the reserved address in the shared memory, said computer readable program code logic, when executing, performing the following:

using the shared memory to maintain consistency in the shared memory, including:

when one of the processor units makes a load-reserve request, storing in one of said reservation registers an address in the shared memory to lock said address for said one of the processor units to maintain consistency of data in the shared memory, and setting the valid bit in the one of the registers to indicate that the address stored in said one of the registers is reserved for said one of the processor units, wherein in response to defined events, the valid bit in said one of the registers is reset to indicate that the address stored in said one of the registers is not reserved for said one of the processor units, including when one of the other processor units stores data at said address, wherein in response to defined events, the valid bit in said one of the registers is reset to indicate that the address stored in said one of the registers is not reserved for said one of the processor units, including, the valid bit in said one of the registers is invalidated to indicate that the address stored in said one of the registers is not reserved for said one of the processor units;

when said one of the processor units makes a store-conditional request to store data at said address in the shared memory, checking the valid bit in said one of the reservation registers to determine if said address in the shared memory is reserved for said one of the processor units;

if the valid bit in said one of the reservation registers shows that said address in the shared memory is reserved for said one of the processor units, storing the data of said store-conditional request at said address in the shared memory; and if the valid bit in said one of the reservation registers shows that said address in the shared memory is not reserved for said one of the processor units, not storing the data of said store-conditional request at said address in the shared memory.

17. The article of manufacture according to claim 16, wherein the memory includes a multitude of slices, and each of the processor units has access to each of said slices.

18. The article of manufacture according to claim 17, wherein each of said slices of the memory is provided with a respective one set of the reservation registers.

19. The article of manufacture according to claim 16, wherein a plurality of threads operate on each of the processor units, and when one of the threads makes a request for an address reservation, one of the reservation registers is checked to determine if said one of the threads has already made an address registration.

20. The article of manufacture according to claim 19, wherein when a thread executes a load request, a memory address is stored in one of the registers, and when the thread executes another load request, the memory address in the register is overwritten; and when the thread executes a store request, the store request is matched against one of the registers.

21. A method of implementing load-reserve and store-conditional instructions in a multi-processor computing system to maintain memory consistency in a shared memory, the computing system including a multitude of processor units, a multitude of L1 memory caches, and an L2 shared memory cache, and the processor units make load-reserve requests to reserve an address in the L2 shared memory and make store-conditional requests to store data to the reserved address in the shared memory, wherein each of the processor units has access to one of the L1 memory caches, and all of the processor units have access to the L2 shared memory cache, the method comprising:

including in the L2 memory cache a series of reservation registers to support load-reserve/store conditional locks, each of the reservation registers including an address field and a valid bit;

using the L2 shared memory to maintain consistency in the L2 shared memory, including:

in response to one of the processor units making a load-reserve request, storing in one of said reservation registers an address in the shared memory to lock said address for said one of the processor units to maintain consistency of data in the shared memory, and setting the valid bit in the one of the registers to indicate that the address stored in said one of the registers is reserved for said one of the processor units, wherein in response to defined events, the valid bit in said one of the registers is reset to indicate that the address stored in said one of the registers is not reserved for said one of the processor units, including when one of the other processor units stores data at said address in the shared memory, the valid bit in said one of the registers is invalidated to indicate that the address stored in said one of the registers is not reserved for said one of the processor units;

in response to said one of the processor units making a store-conditional request to store data at said address in the L2 shared memory, checking the valid bit in said one of the reservation registers to determine if said address in the shared memory is reserved for said one of the processor units;

if the valid bit in said one of the reservation registers shows that said address is reserved for said one of the processor units, storing the data of said store-conditional request at said address in the L2 shared memory; and if the valid bit in said one of the reservation registers shows that said address in the shared memory is not reserved for said one of the processor units, not storing the data of said store-conditional request at said address in the shared memory.

22. The method according to claim 21, wherein the L2 memory cache includes a multitude of slices, and each of the processor units has access to each of said slices.

23. The method according to claim 22, wherein the providing includes providing each of said slices of the L2 memory cache with a respective one set of the reservation registers.

24. The method according to claim 21, the series of reservation registers includes a multitude of sets of the reservation registers, and the storing includes, each of the processor units using a respective one of said sets of reservation registers to reserve addresses in the L2 memory cache for said each processor unit.

25. The method according to claim 21, wherein:

a plurality of threads operate on each of the processor units, and when one of the threads makes a request for an address reservation, one of the registration registers is checked to determine if said one of the threads has already made an address registration;

when said one of the threads makes a store request, said one of the registration registers is checked to determine if said one of the threads has make a valid address registration;

when a thread executes a load request, a memory address is stored in one of the registers, and when the thread executes another load request, the memory address in the register is overwritten; and when the thread executes a store request, the store request is matched against one of the registers.

* * * * *